(12) United States Patent
Brickell

(10) Patent No.: US 7,359,518 B2
(45) Date of Patent: Apr. 15, 2008

(54) DISTRIBUTION OF SECURED INFORMATION

(75) Inventor: Ernie F. Brickell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 948 days.

(21) Appl. No.: 09/828,695

(22) Filed: Apr. 5, 2001

(65) Prior Publication Data

US 2002/0147917 A1    Oct. 10, 2002

(51) Int. Cl.
*H04L 9/00* (2006.01)

(52) U.S. Cl. .................. 380/286; 380/283; 726/30; 713/171; 713/182

(58) Field of Classification Search ........ 380/277–286, 380/44; 713/182, 171, 701, 201; 726/30
See application file for complete search history.

(56) References Cited

U.S. PATENT DOCUMENTS 5,557,765 A * 9/1996 Lipner et al. ............... 380/286
5,838,792 A * 11/1998 Ganesan ...................... 380/282
5,937,066 A * 8/1999 Gennaro et al. ............. 380/286
6,367,009 B1 * 4/2002 Davis et al. ................. 713/166
6,662,299 B1 * 12/2003 Price, III ..................... 713/171
6,754,349 B1 * 6/2004 Arthan ........................ 380/286

OTHER PUBLICATIONS

Bruce Schneier, Applied Cryptography 2nd Edition, Oct. 1995, John Wiley & Sons Pub., pp. 97-98.*

* cited by examiner

*Primary Examiner*—Emmanuel L. Moise
*Assistant Examiner*—Paul Callahon
(74) *Attorney, Agent, or Firm*—Fish & Richardson P.C.

(57) ABSTRACT

Secured information is stored on a server accessible to a network. A first access component that is required to permit use of the secured information is distributed to a delegate. In the absence of a second access component, the first access component is not sufficient to permit use of the secured information. The second access component can be stored on the server or stored with a third party for distribution to the delegate.

46 Claims, 6 Drawing Sheets

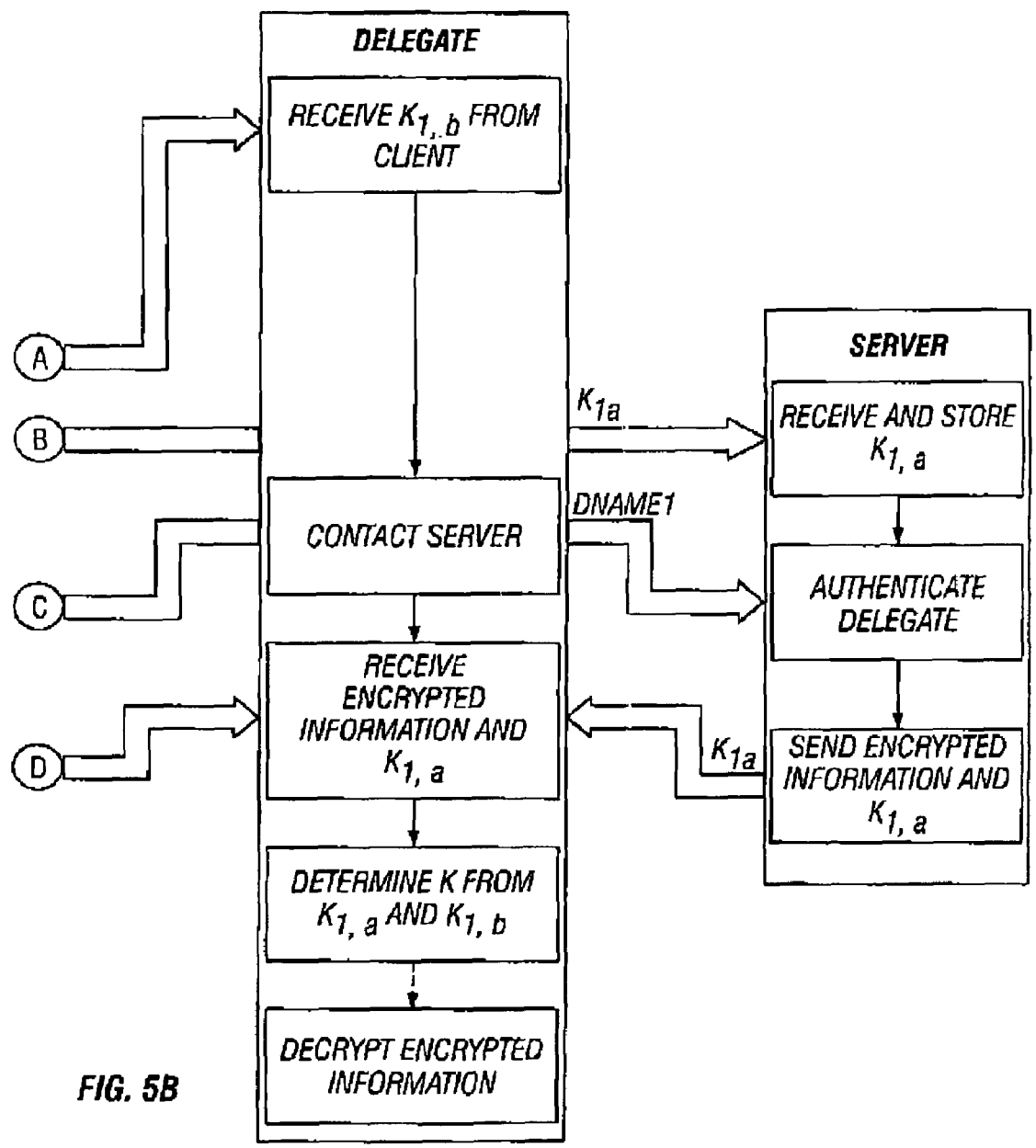

DISTRIBUTION OF SECURED INFORMATION

BACKGROUND

This invention relates to distributing secured information.

Confidential information is typically stored on computer systems that provide security by limiting access to the information. Examples of such information include legal, financial, and medical information about an individual, as well as legal, financial, and business information about an organization.

DETAILED DESCRIPTION

Figure 1:
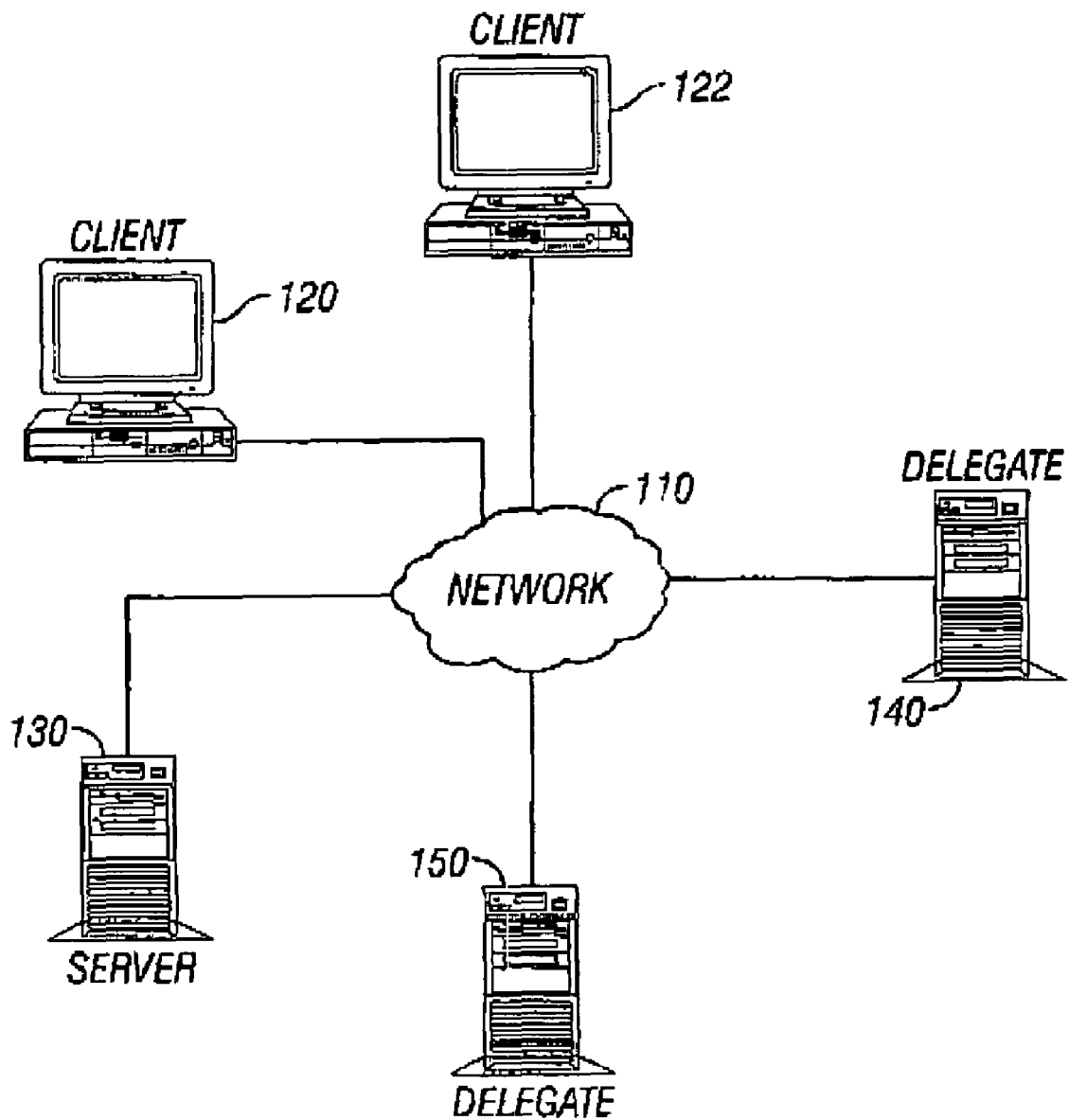
FIG. 1 is a schematic of a network for distributing secured information.

Referring to FIG. 1, a client system 120 is connected to a communications network 110, such as a computer network, e.g., an intranet or the Internet, or a telecommunications network, such as a wireless network (e.g., a BlueTooth, General Packet Radio Service (GPRS), i-mode™ (NTT DoCoMo, Japan), Global System for Mobile Communications (GSM), Code Division Multiple Access (CDMA), or Time Division Multiple Access (TDMA) link). The network 110 interconnects the client system 120, a server 130, and one or more delegates 140 and 150. Additional client systems 122 can also be connected to the same network 110 and can use the network in the same way as the client system 120.

For some of the communications between the parties, information is exchanged privately, e.g., by using common web technologies such as Secure Sockets Layer (SSL), or by building encryption into the application using encryption toolkits, such as Bsafe® provided by RSA Security (Bedford, Mass., USA). Further, for some of the communications between the parties, the receiver of the information authenticates the sender of the message, e.g., by using digital signature technology (e.g., as available in toolkits such as Bsafe®) and having the parties obtain a digital certificate from a trusted certificate authority. The digital certificate contains the unique Dname (or distinguished name) of the party, and the public key of the party. The party sending the message signs message signs the message with their private key and the receiving party verifies the signature and the digital certificate of the sender.

Figure 2:
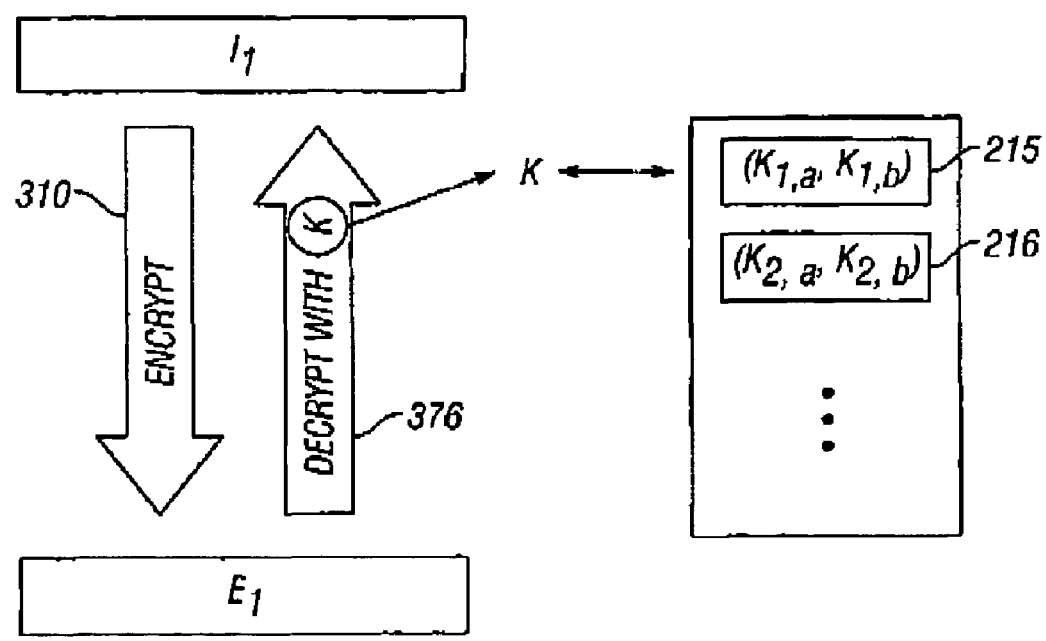
FIG. 2 is a schematic of secured information, a decryption key, and values determining the decryption key.
Figure 3:
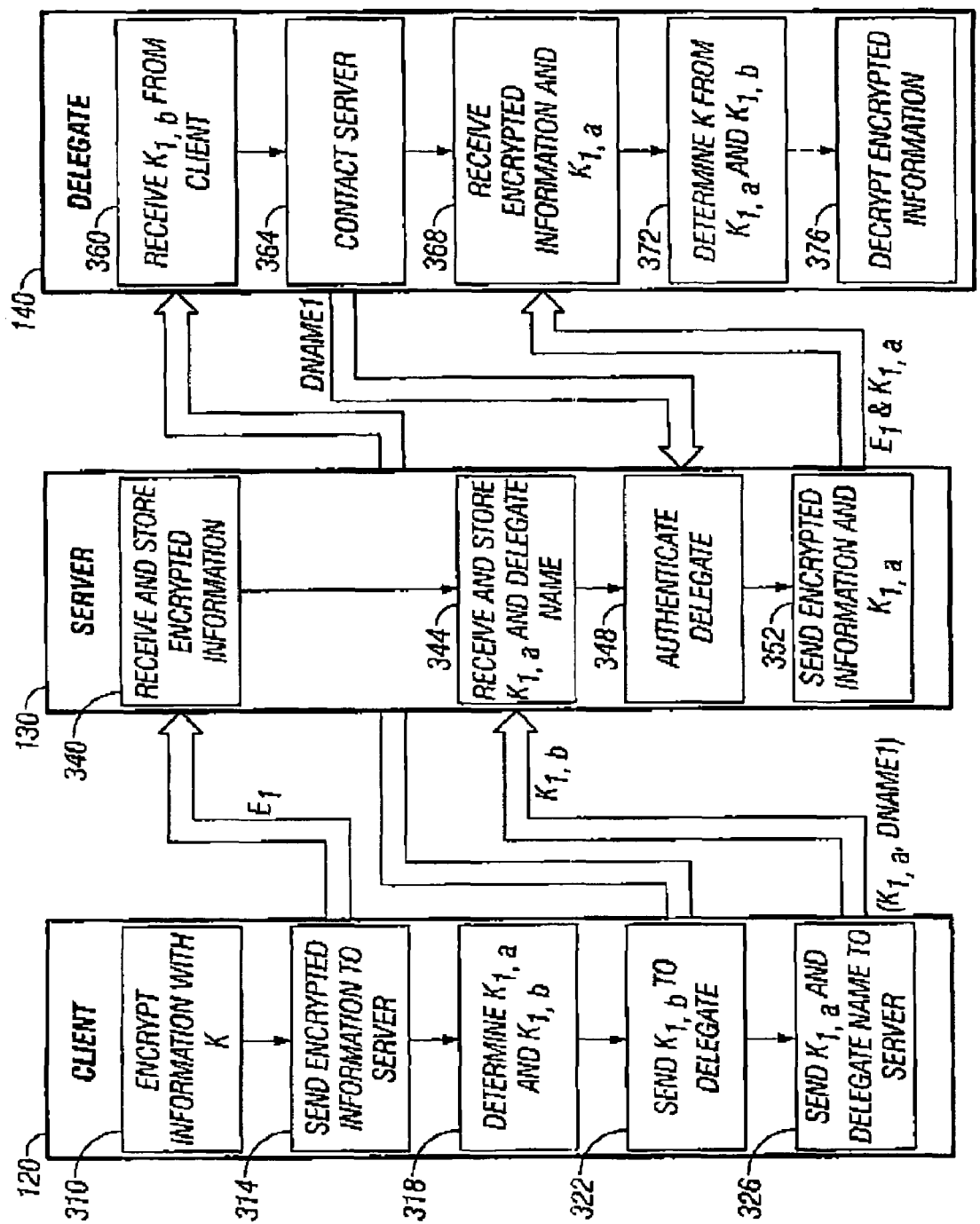
FIG. 3 is a flow chart of a process for distributing secured information to a delegate.
Figure 4:
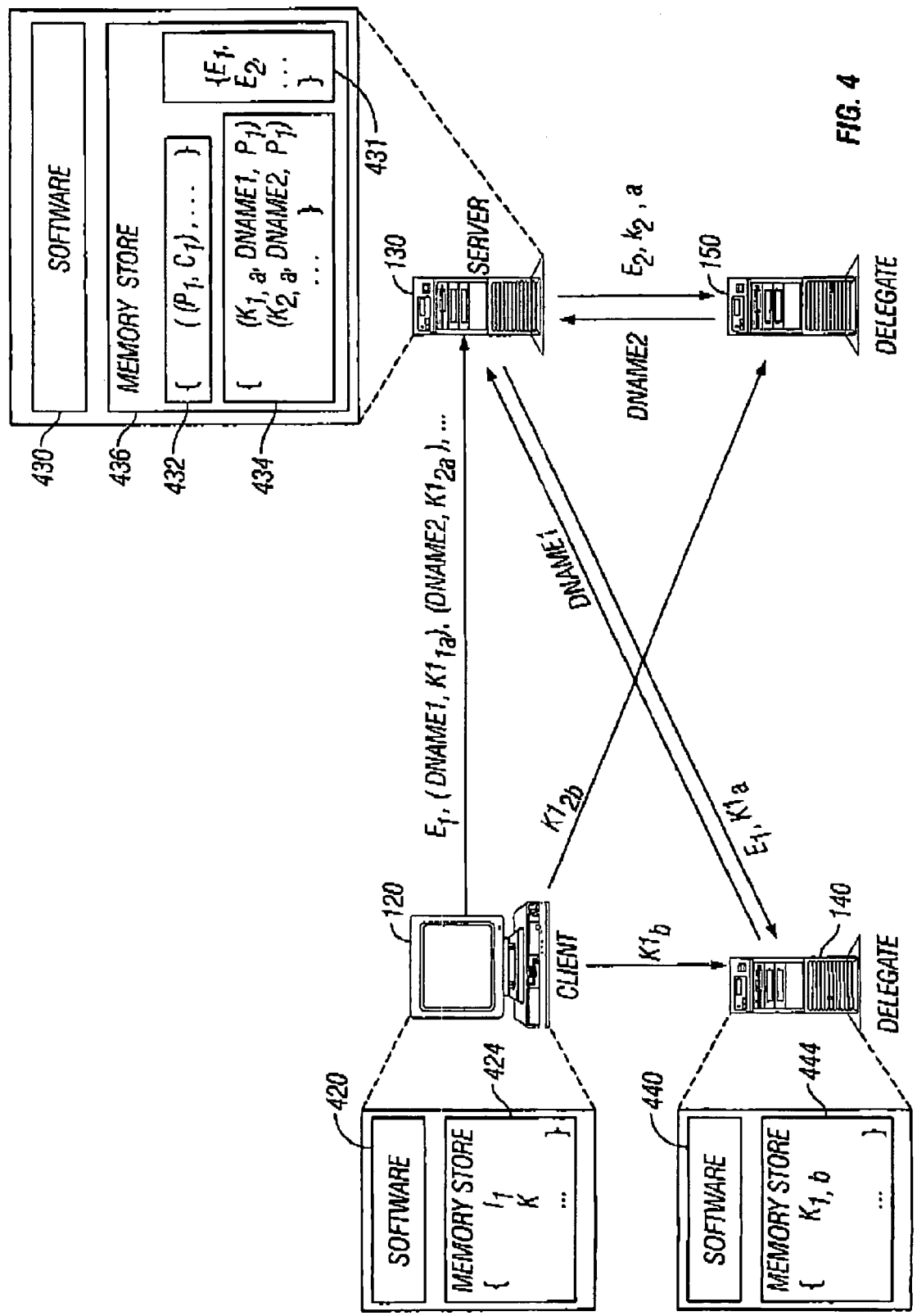
FIG. 4 is a schematic of the distribution of access components for secured information.

Referring to the example in FIGS. 2, 3 and 4, a client system 120 secures information I1 by encrypting it 310 using an encryption key, Ken. Encryption can be performed by software 420 running on the client system 120. The encrypted information E1 is sent 314 from the client 120 across the network 110 to the server 130, e.g., a remote server, for storage. The server 130 stores the encrypted information E1 in a repository 431 within a memory store 436. The memory store 436 can include a table 432 with a row that associates a pointer P1 to secured information E1 and an identifier C1 for the client system 120. Additional rows can be used to associate similar information E2 for a different client system 122, or for other information E3 from the client system 120.

The key, K, required for decryption can be the same as the encryption key ("K=$K_{en}$", e.g., as is the case for symmetric encryption algorithms and functions) or different ("K≠$K_{en}$", e.g., as is the case for asymmetric encryption algorithms).

The decryption key K is related by a predetermined function or functions to one or more sets 215 and 216 of values, ($K_{1,a}$, $K_{1,b}$) and ($K_{2,a}$ and $K_{2,b}$) respectively. Such values may include a binary number, a bit map, a character string, or an integer. Referring to the example depicted in FIG. 2, a first set 215 includes the values $K_{1,a}$ and $K_{1,b}$. The key K is determined by the predetermined functions f as shown in Equation 270. The first set of values can be used to determine the decryption key K. Alternatively, as depicted in FIG. 3, the decryption key K can be determined first, and then the first set 215 of values is generated 318.

A variety of functions can be used for the predetermined functions, f, depicted in Equation 270. The functions can have one or more of the following properties. The function, given a set of input values, provides a uniquely determined result that is the key. The function is efficient to compute. Knowledge of the function and one of the values of the set should not alter the probability of guessing the key correctly, e.g., the key remains computationally infeasible to determine given the function and one of the values.

Examples of the functions include XOR, or an encryption algorithm such as Advanced Encryption Standard (AES) or Data Encryption Standard (DES). To apply the Boolean XOR function, each bit of the key is determined by the result of applying the Boolean XOR to the corresponding bits of the values of the set. Under the Boolean XOR function, "0 XOR 0=0"; "0 XOR 1=1"; "1 XOR 0=1"; and "1 XOR 1=0".

For an example, $K_{1,b}$ can be generated by a random number generator. $K_{1,a}$ is then determined such that applying a selected function to $K_{1,a}$ and $K_{1,b}$ returns the value of the key K. If the selected function is XOR, for example, each bit of $K_{1,a}$ is determined as K XOR $K_{1,b}$. The resulting value of $K_{1,a}$ is such that K is the result of $K_{1,a}$ XOR $K_{1,b}$.

For an example using an encryption algorithm such as AES, $K_{1,b}$ can be generated by a random number generator. $K_{1,a}$ is then determined by encrypting K with the key $K_{1,b}$. Then K can be determined from $K_{1,a}$ and $K_{1,b}$ by decrypting $K_{1,a}$ with the key $K_{1,b}$.

A second set 216 of values 221, 223 can be generated such that the values of the second set 216, the values $K_{2,a}$ and $K_{2,b}$, are also related to the decryption key K by the predetermined function as described by Equation 270. The values $K_{2,a}$ and $K_{2,b}$ differ from $K_{1,a}$ and $K_{1,b}$ although each pair alone can be used to determine the decryption key K. Further, a value of the first set 215, e.g., $K_{2,a}$, cannot typically be used with a value of the second set 216, e.g., $K_{1,b}$, to determine the decryption key K.

In certain cases, the value of $K_{1,b}$ is set to be equal to K. In this instance, the predetermined function f would be the function f(x,y)=y, and the value of $K_{1,a}$ would be irrelevant.

A delegate 140 is a person or entity who has been authorized by the client to access the information $I_1$. A delegate 140 will be identified by a distinguished name, Dname1. The value $K_{1,b}$ from the first set 215 is sent 322 to the delegate 140, e.g., electronically across a computer network 110. The value $K_{1,b}$ can be encrypted, e.g., using public key cryptography to protect the contents of $K_{1,b}$ during transmission to the delegate 140. The delegate 140 receives 360 the value $K_{1,b}$ from the client 120. If the value is encrypted, the delegate 140 decrypts the value. Another delegate 150 with distinguished name, Dname2, who is also authorized to view the information $I_1$ receives the value $K_{2,b}$ from the second set 216. The value $K_{1,a}$ and the name of the delegate 140 (Dname1) is sent 326 by the client over a secure channel to the server 130. The value $K_{2,a}$ and the name of the delegate 150 (Dname2) is sent 326 by the client over a secure channel to the server 130.

The server 130 receives and stores 340 this information, for example, as follows. The server 130 stores the value $K_{1,a}$, Dname1, and a pointer ($P_1$) to the location of the encrypted information $E_1$ in a row of table 434. Another table row of the table 434 associates the value $K_{2,a}$, Dname2, and a pointer ($P_1$) to the location of the encrypted information $E_1$. The memory locations for 431, 432, and 434 can be located in the same or different data storage units, e.g., the memory store 436. For example, they can be different tables of a relational database that is stored on the server 130.

In some cases, multiple different delegates can receive the same value $K_{1,b}$. For each delegate that receives $K_{1,b}$, the server will be sent the Dname of that delegate and the corresponding value $K_{1,a}$.

As described above, the values stored on the server are such that one or more, but not all the values needed to access the secured information $E_1$ are stored on the server 130. If the security of the server 130 is breached, illicit use of the secured information $E_1$ is prevented since the information needed to decrypt the secured information $E_1$ cannot be obtained from the server 130.

When the delegate 140 is ready to access the information $I_1$, the delegate 140 contacts 364 the server 130 with a request for the encrypted information $E_1$ and identifies itself with a descriptor, Dname1. The delegate 140 can also include a digital certificate with the request so that the server 130 can authenticate 348 its identity. Also, the client system 120 can be contacted to confirm that access is authorized. Once authenticated, the server 130 looks up the appropriate value associated with the delegate's identity in the table 434, and transmits the secured information $E_1$ and the value, i.e., $K_{1,a}$, to the delegate 140. The server 130 can log all such requests, both fulfilled requests and denied requests. The server can send the log periodically to the client system 120 or can notify the client system 120 of a pending, fulfilled, or denied request.

The server 130 sends 352 the encrypted information $E_1$ and the value associated with Dname1, i.e., $K_{1,a}$, to the delegate 140.

After receiving 368 the encrypted information $E_1$ and value $K_{1,a}$, the delegate 140 determines 372 the key K using the predetermined function by providing $K_{1,a}$ and $K_{1,b}$ as arguments for the function. The encrypted information $E_1$ is decrypted 376 with the key K to obtain the information $I_1$.

Referring to FIG. 4, the client system 120 can include software 420 for effecting, for example, one or more of steps 314, 318, 322, and 326. The client system 120 also includes a medium for information storage 424 which can store, e.g., the information $I_1$, the secured information $E_1$, the key K, and so forth. The delegate 140 can include a medium for information storage 444 and software 440 for effecting, for example, one or more of steps 360, 364, 368, 372, and 376. The server 130 can include a medium for information storage 436 as described above and software 420 for effecting, for example, one more of steps 340, 344, 348, and 352.

The methods described here provide the server 130 and the client system 120 with multiple methods to regulate access to the secure information $E_1$. To revoke access from a delegate 140 who was previously authorized, the server 130 can simply mark that delegate 140 should not be allowed access. Then if delegate 140 requests access, the server 130 would not supply either the encrypted information $E_1$ or the key value $K_{1,a}$ to that delegate 140.

The server 130 could also destroy the key value $K_{1,a}$, thereby removing the possibility of delegate 140 ever getting the key value again, even if the server's security is compromised. If this step is taken, then all delegates who depended upon $K_{1,a}$ for access would have their access denied. This situation is alleviated if all delegates receive unique values of $K_{1,a}$ and $K_{1,b}$.

In yet a further step, the server could destroy the copy of $E_1$, thereby denying access to all delegates. In this case, the client 120 can reinitiate the process to give delegates access to the information $I_1$, e.g., by encrypting the information with a new key and distributing the keys and encrypted information as described.

The methods described here can also be used to regulate access to the secured information with respect to time. In addition to storing a value for information access with a delegate identifier, the server 130 can store a date and time interval during which the delegate 140 is authorized to obtain the secured information. The server 130 can deny the delegate 140 the access if the time interval has elapsed.

Similarly, the server 130 can deny access to the delegate 140 in response to a trigger. Examples of triggers include an instruction from the client system 120, a security breach of the server 130 or the delegate 140 system, and the lapsing of a predetermined time interval. A trigger causes the server 130 to deny a delegate 140 the value for information access (i.e., $K_{1,a}$). In some cases, this denial is effected specifically for the delegate 140, whereas access is maintained for the delegate 150. For example, the value $K_{1,a}$ but not $K_{2,a}$ can be deleted from the repository 434 on the server 130. Alternatively, the denial can be imposed for all delegates (e.g., 140 and 150). For additional flexibility, the client system 120 can generate 318 multiple sets of values for information access, and send 326 at least one value of each set to the server 130 without an associated delegate identifier. The delegate identifier, such as Dname1, can be provided later, e.g., individually, as delegates are authorized for information access. In some implementations, no delegate identifier is required. For example, the values stored on the server 130 can be freely available without jeopardizing security, as these values alone do not provide access to the secured information $E_1$. In this case, an illicit attack on the server would not reveal information about the parties that possess the additional access components required to use the secured information.

In some embodiments, the server 130 does not have complete information regarding the identity of the delegate 140. For example, the client 120 provides a pseudonym for the delegate 140 as Dname rather than an identifier that makes the real identity of the delegate 140 apparent. The client 120 also provides the pseudonym to the delegate 140. This pseudonym can be kept private, e.g., such that the pseudonym is reserved for communications between these three parties. The delegate 140 requests access, in part, by identifying itself to the server 130 by means of the pseudonym. Use of pseudonyms provides additional protection for the client 120 against an attack on the server 130. For even if an adversary obtained access to the server 130, the adversary would not be able to uncover the identities of the delegates 140 and thereby locate the missing values needed to decrypt the information on the server 130. The process of using the pseudonym in the identification process can use one of a number of different known identification methods to ensure that the secret information held by the delegate is not revealed in the case that an adversary is trying to impersonate the server 130.

In some embodiments, information is divided into multiple segments. Each segment is secured independently such that access to a segment can be granted without providing access to another segment. For example, information with multiple information segments $I_1$ and $I_2$ is encrypted as follows. Segment $I_1$ is encrypted as $E_1$ such that $E_1$ can be decrypted with the key K1 to recover the segment $I_1$ whereas segment $I_2$ is encrypted as $E_2$ such that $E_2$ can be decrypted with the key K2 to recover the segment $I_2$.

Further, in some implementations, in which the key K1 is a predetermined function of $K1_{1,a}$ and $K1_{1,b}$ and the key K2 is a predetermined function of $K2_{1,a}$ and $K2_{1,b}$, the values $K1_{1,b}$ and $K2_{1,b}$ can be set to be equal to one another. This value is sent by the client system 120 to the delegate 140 or a group of delegates for which access to these segments $I_1$ and $I_2$ is authorized. The values $K1_{1,a}$ and $K2_{1,a}$ are determined from the values of (K1 and $K1_{1,b}$) and (K2 and $K2_{1,b}$) as described earlier. The server 130 stores $K1_{1,a}$ as the value required for delegate 140 to assess the segment secured as $E_1$ and $K2_{1,a}$ as the value required for delegate 140 to assess the segment secured as $E_2$.

Although the sets 215 and 216 depicted in FIG. 2 includes two values, in other examples, the set can include three, four, five, six, or more values. Additional values can be used to distribute the authority to give access to the information among multiple servers. For example, five values can be required by a delegate to compute the value of K. The client 120 gives the delegate 140 one of the values, and distributes the other four values to four different servers. To access the information, the delegate 140 authenticates itself and obtains a value from each of the four servers. Then if the client 120 wishes to terminate the access of the delegate 140, the client 120 instructs all four servers to delete the value for this delegate 140. If at least one of the servers acts correctly and actually deletes the value, then access for the delegate 140 would, in fact, be terminated. In some implementations, the same predetermined function is used to relate each set of values such that application of the function to values of each set provides the same result, i.e., the key, as depicted in Equation 270 of FIG. 2. However, different functions can be used to relate the values of each set to the key. Information about the appropriate function is then distributed accordingly.

Figure 5A:
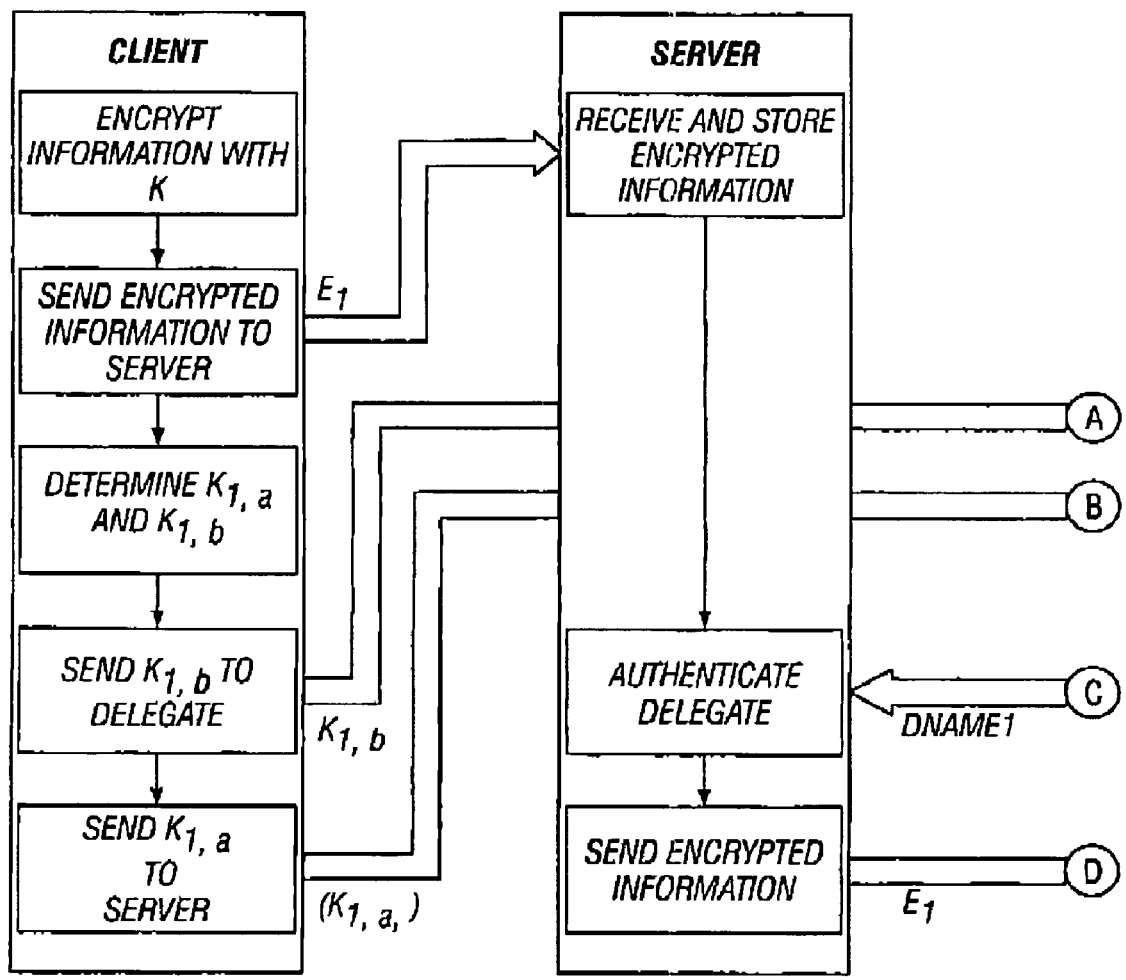
FIG. 5 is a flow chart of a process for distributing secured information to a delegate.

In some cases, access components for the secured information $E_1$ are not stored on the server 130 where the secured information $E_1$ is stored. The access components can be stored on a second system, e.g., a server other than server 130, such as a server operated by an independent party from the operator of server 130, as shown in FIG. 5. Alternatively, the access components can be distributed by the client system 120 directly to the delegates 140 and 150. The different access components needed to access the secured information can be sent separately, e.g., at different times or by different routes.

Examples of secured information can include a medical record (e.g., a doctor's note, a genetic test, a diagnostic test for a pathogen such as Human Immunodeficiency Virus (HIV), or an image such as an magnetic resonance image (MRI)), a financial record (e.g., an account statement, credit history, portfolio value, insurance coverage), legal information (e.g., attorney-client privileged material, contracts, criminal records, government records, tax records), personal information (e.g., resumes, college grades, or test scores), or corporate information (e.g., accounting information, or strategic information for corporate partners and alliances). In the example in which the secured information includes a medical record, the client system can be an individual that distributes access to the medical record to an insurance agency, a physician, a health maintenance organization (HMO), or a government agency. Furthermore, the secured information can be text, graphic, or multi-media information for distribution among subscribing customers. In this example, the secured information could be an investment advice newsletter, or a bulletin of business news.

Among other advantages, the methods and systems described here allow users to store private information on an accessible server such that: (1) only designated parties can access the private information; and (2) even if the server's security is compromised, the user's private information remains protected.

Other implementations are within the scope of the claims. For example, information can be secured by any available method, e.g., a method other than a cryptographic method. The information is secured such that at least two access components are required to access the secured information. The access components can be distributed in a manner similar to that described above. Distribution can include, for example, manual, mechanical, electronic, and optical distribution channels, and combinations thereof.

Further, the techniques described here are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, and similar devices that each include a processor, a storage medium readable by the processor (including volatile and non-volatile memory and/or storage elements), at least one input device, and one or more output devices.

Each program may be implemented in a high-level procedural or object oriented programming language to communicate with a machine system. However, the programs can be implemented in assembly or machine language, if desired. In any case, the language may be a compiled or interpreted language.

Each such program may be stored on a storage medium or device, e.g., compact disc read only memory (CD-ROM), hard disk, magnetic diskette, or similar medium or device, that is readable by a general or special purpose programmable machine for configuring and operating the machine when the storage medium or device is read by the computer to perform the procedures described in this document. The system may also be implemented as a machine-readable storage medium, configured with a program, where the storage medium so configured causes a machine to operate in a specific and predefined manner.

What is claimed is:

1. A method comprising:

defining a key and a set of values, the key able to be derived using the values and a predefined relationship between the values;

sending a first value of the set, but not all of the values of the set and information encrypted using the key to a server for storage; and sending a second value of the set, but not all of the values of the set to a first delegate, wherein the first delegate comprises a person or an entity who has been authorized to access the encrypted information, and wherein the encrypted information is
accessible with the key,
inaccessible with the first of the values of the set absent the second of the values of the set, and
inaccessible with the second of the values of the set absent the first of the values of the set.

2. The method of claim 1 further comprising:
generating a second set of values, the key being determinable by the values of the second set;
sending a first but not all of the values of the second set to the server; and
sending a second but not all of the values of the second set to a second delegate,
wherein the encrypted information is
inaccessible with the first of the values of the second set absent the second of the values of the second set, and
inaccessible with the second of the values of the second set absent the first of the values of the second set.

3. The method of claim 2 in which the values of the second set are also determinable by the predefined relationship.

4. The method of claim 1 in which the set includes exactly two values.

5. The method of claim 1 in which the set includes three or more values.

6. The method of claim 1 in which the first value is associated with a descriptor of the first delegate.

7. The method of claim 1 in which the probability of guessing the key correctly using knowledge of one or more of the values of the set, but not all the values of the set, is the same as the probability of guessing the key correctly using no knowledge of any value of the set.

8. The method of claim 7 in which the predefined relationship comprises one or more of the Boolean XOR function and a relationship that applies an encryption algorithm to one value of the set using another value of the set as the encryption algorithm key.

9. The method of claim 1 in which the information comprises medical information.

10. The method of claim 1 further comprising sending, to the server, instructions for allowing the first delegate to access the first of the values.

11. The method of claim 1, wherein the person or the entity has been authorized by a definer of the key and the set of values.

12. A method comprising:
storing, on a server accessible through a network, secured information and a first access component, access to the secured information requiring a key, the key able to be derived using the first access component, a second access component, and a relationship between the first and second access components;
excluding both the key and the second access component from storage on the server; and
providing the secured information and the first access component to a first requestor, wherein the first requestor comprises a delegate who has been authorized to access the secured information.

13. The method of claim 12 further comprising storing a third access component on the server, the third access component, when combined with a fourth access component that is excluded from storage on the server, being sufficient to permit access to the secured information.

14. The method of claim 13 further comprising providing the secured information and the third access component to a second requestor.

15. The method of claim 13 further comprising deleting the third access component in response to a trigger, the trigger being a client instruction, a time limit, a request from the first requestor, or a security breach.

16. The method of claim 13 further comprising identifying the requestor and determining that the requestor requires the first access component but not the third access component.

17. The method of claim 12 further comprising storing permission information about a party approved for access, such that the secured information and the first access component are only provided if the first requestor is the approved party.

18. The method of claim 12 in which the secured information is secured by encryption using a key, and the first and second access components are related to the key by a predefined relationship.

19. A method comprising:
receiving
a) from a client, a first access component,
b) from a server accessible through a network, secured information, access to the secured information requiring a key, the key able to be derived using the first access component and a second access component, and
c) from a source other than the client or the server, the second access component,
wherein the secured information is
accessible with the key,
inaccessible with the first access component absent the second access component, and
inaccessible with the second access component absent the first access component.

20. The method of claim 19 in which the source is the server.

21. The method of claim 19 in which a third access component is required in addition to the first and second access components for use of the secured information.

22. The method of claim 19 in which the secured information, the first access component, and the second access component are received in a digital form.

23. The method of claim 19, further comprising sending authentication information to the source other than the client or the server to access the second access component.

24. The method of claim 19, wherein receiving the second access component comprises receiving the second access component from a delegate who has been authorized by the client to access the secured information.

25. An article comprising a machine-readable medium that stores machine-executable instructions, the instructions being operable to cause a machine to:
define a key and a set of values, the key able to be derived using the values and a predefined relationship between the values;
send a first but not all of the values of the set and information encrypted using the key to a server for storage; and
send a second but not all of the values of the set to a first delegate,
wherein the first delegate comprises a person or an entity who has been authorized by a definer of the key and the set of values to access the encrypted information, and
wherein the encrypted information is
accessible with the key, inaccessible with the first of the values absent the second of the values, and inaccessible with the second of the values absent the first of the values.

26. The article of claim 25 in which the instructions further cause a machine to:

generate a second set of values, the key being independently determinable by the values of the second set;

send a first but not all of the values of the second set to the server; and send a second but not all of the values of the second set to a second delegate, wherein the encrypted information is inaccessible with the first of the values of the second set absent the second of the values of the second set, and inaccessible with the second of the values of the second set absent the first of the values of the second set.

27. An apparatus comprising a processor and instructions configured to cause the processor to:

receive, from a client, information and a value of a set of values, the information being encrypted using a key, the key able to be derived using the values of the set and a predefined relationship between the values;

store the information and the value, but not all the values of the set; and transmit, to a delegate who has been authorized by the client to access the information, the information and the value.

28. The apparatus of claim 27 in which the software is further configured to cause the processor to:

store a second value that is a member of a second set of values, the values of the second set being sufficient to determine the key using the predefined relationship.

29. The apparatus of claim 28 in which the software is further configured to cause the processor to:

delete or deny access to the second value in response to a trigger, the trigger being a client instruction, a time limit, a request from the delegate, or a security breach.

30. The apparatus of claim 27 in which the information comprises medical information.

31. A method comprising:

defining a key and a set of values, the key able to be derived using the values and a predefined relationship between the values;

sending a first value of the set, but not all of the values of the set and information encrypted using the key to a server for storage;

sending a second value of the set, but not all of the values of the set to a first delegate;

generating a second set of values, the key being determinable by the values of the second set;

sending a first but not all of the values of the second set to the server; and sending a second but not all of the values of the second set to a second delegate, wherein the encrypted information is accessible with the key, inaccessible with the first of the values of the set absent the second of the values of the set, inaccessible with the second of the values of the set absent the first of the values of the set, inaccessible with the first of the values of the second set absent the second of the values of the second set, and inaccessible with the second of the values of the second set absent the first of the values of the second set.

32. The method of claim 31 in which the values of the second set are also determinable by the predefined relationship.

33. The method of claim 31 in which the first value is associated with a descriptor of the first delegate.

34. A method comprising:

defining a key and a set of three or more values, the key able to be derived using the values and a predefined relationship between the values;

sending a first value of the set, but not all of the values of the set and information encrypted using the key to a server for storage; and sending a second value of the set, but not all of the values of the set to a first delegate, wherein the encrypted information is accessible with the key, inaccessible with the first of the values of the set absent the second of the values of the set, and inaccessible with the second of the values of the set absent the first of the values of the set.

35. A method comprising:

defining a key and a set of values, the key able to be derived using the values and a predefined relationship between the values;

sending a first value of the set, but not all of the values of the set and information encrypted using the key to a server for storage; and sending a second value of the set, but not all of the values of the set to a first delegate, wherein the first value is associated with a descriptor of the first delegate, and wherein the encrypted information is accessible with the key, inaccessible with the first of the values of the set absent the second of the values of the set, and inaccessible with the second of the values of the set absent the first of the values of the set.

36. A method comprising:

defining a key and a set of values, the key able to be derived using the values and a predefined relationship between the values;

sending a first value of the set, but not all of the values of the set and information encrypted using the key to a server for storage; and sending a second value of the set, but not all of the values of the set to a first delegate, wherein the encrypted information is accessible with the key, inaccessible with the first of the values of the set absent the second of the values of the set, and inaccessible with the second of the values of the set absent the first of the values of the set, and wherein the probability of guessing the key correctly using knowledge of one or more of the values of the set, but not all the values of the set, is the same as the probability of guessing the key correctly using no knowledge of any value of the set.

37. The method of claim 36 in which the predefined relationship comprises one or more of the Boolean XOR function and a relationship that applies an encryption algorithm to one value of the set using another value of the set as the encryption algorithm key.

38. A method comprising:

storing, on a server accessible through a network, secured information and a first access component, access to the secured information requiring a key, the key able to be derived using the first access component, a second access component, and a relationship between the first and second access components;

excluding both the key and the second access component from storage on the server;

storing a third access component on the server, the third access component, when combined with a fourth access component that is excluded from storage on the server, being sufficient to permit access to the secured information; and providing the secured information and the first access component to a first requestor.

39. The method of claim 38 further comprising providing the secured information and the third access component to a second requestor.

40. The method of claim 38 further comprising deleting the third access component in response to a trigger, the trigger being a client instruction, a time limit, a request from the first requestor, or a security breach.

41. The method of claim 38 further comprising identifying the requestor and determining that the requestor requires the first access component but not the third access component.

42. The method of claim 38 further comprising storing permission information about a party approved for access, such that the secured information and the first access component are only provided if the first requestor is the approved party.

43. The method of claim 38 in which the secured information is secured by encryption using a key, and the first and second access components are related to the key by a predefined relationship.

44. An article comprising a machine-readable medium that stores machine-executable instructions, the instructions being operable to cause a machine to:

define a key and a set of values, the key able to be derived using the values and a predefined relationship between the values;

send a first but not all of the values of the set and information encrypted using the key to a server for storage;

send a second but not all of the values of the set to a first delegate;

generate a second set of values, the key being independently determinable by the values of the second set;

send a first but not all of the values of the second set to the server; and send a second but not all of the values of the second set to a second delegate, wherein the encrypted information is
  accessible with the key,
  inaccessible with the first of the values absent the second of the values,
  inaccessible with the second of the values absent the first of the values,
  inaccessible with the first of the values of the second set absent the second of the values of the second set, and
  inaccessible with the second of the values of the second set absent the first of the values of the second set.

45. An apparatus comprising a processor and instructions configured to cause the processor to:

receive, from a client, information and a value of a set of values, the information being encrypted using a key, the key able to be derived using the values of the set and a predefined relationship between the values;

store the information and the value, but not all the values of the set;

transmit, to a delegate, the information and the value;

store a second value that is a member of a second set of values, the values of the second set being sufficient to determine the key using the predefined relationship; and delete or deny access to the second value in response to a trigger, the trigger being a client instruction, a time limit, a request from the delegate, or a security breach.

46. An apparatus comprising a processor and instructions configured to cause the processor to:

receive, from a client, information and a value of a set of values, the information being encrypted using a key, the key able to be derived using the values of the set and a predefined relationship between the values;

store the information and the value, but not all the values of the set;

transmit, to a delegate, the information and the value; and store a second value that is a member of a second set of values, the values of the second set being sufficient to determine the key using the predefined relationship.

* * * * *